Patented Aug. 18, 1936

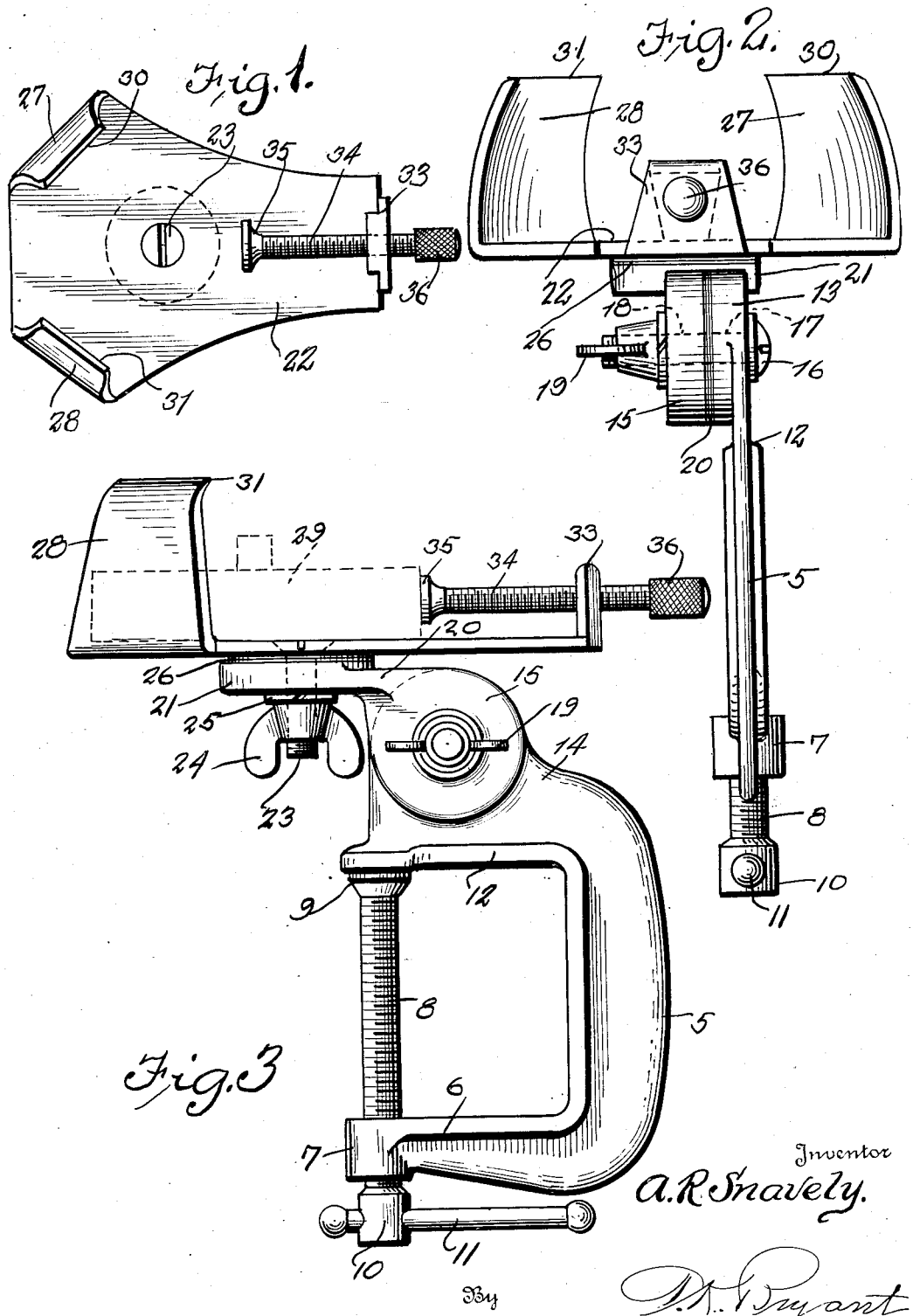

2,051,427

UNITED STATES PATENT OFFICE 2,051,427

DENTAL FLASK HOLDER

Arnold R. Snavely, Ashland, Ohio

Application August 17, 1934, Serial No. 740,357

1 Claim. (Cl. 81—41)

This invention relates to improvements in dental flask holders and the primary object of this invention is to provide a dental flask holder capable of being moved in a universal fashion to any desired position.

A further object of this invention is to provide a dental flask holder having means for detachably securing the same to a work bench or other support in order that the device may be removed when not being in use.

A further object of this invention is to provide a device of the above mentioned character having clamped holding members, two of which are inclined in such a manner as to cause the flask sections to be forced downwardly against the support when the clamping jaw is moved into holding position.

Other objects and advantages of the invention will become apparent during the course of the following description, taken with the drawing, wherein, Figure 1 is a top plan view of the flask holding clamp illustrating the engaging jaws;

Figure 2 is an end elevation illustrating the flask holder secured to the clamp capable of swinging on a horizontal axis; and Figure 3 is a side elevation of the flask holder illustrating the pivot for allowing horizontal swinging movement of the flask holder.

In the drawing, wherein for the purpose of illustrating the invention and wherein like reference characters will be employed to designate like parts throughout the same, the reference character 5 will generally be employed to designate a U-shaped frame having a leg portion 6, the free end of which as at 7, is formed with an enlarged screw threaded boss for receiving a screw threaded clamping rod 8. A bench engaging surface 9 is secured to one end of the screw threaded rod 8 while the opposite end is provided with an enlarged head 10 having a transverse bore for receiving a handle 11.

The other leg 12 of the U-shaped frame 5 is provided with a circular boss 13 formed integral with the U-shaped frame and extending from the web portion 14.

A correspondingly shaped circular boss 15 is pivoted to the boss 13 by means of a screw 16 extending through openings 17 and 18 in the circular bosses 13 and 15 respectively and threaded on the end of the screw 16 is a wing nut 19 for retaining the members in close engagement and against relative movements. Interposed between the circular bosses 13 and 15 is a series of washers or friction elements 20 whereby the circular bosses 13 and 15 may be held against movement when tightened by the wing nut 19.

Tangentially extending from the boss 15 is a bracket 20 terminating in a circular boss 21 extending at right angles to the boss 15 to form a pivotal support for the base portion 22 of a dental flask holder. A machine screw 23 may be provided for connecting the base 22 to the boss 21 of the bracket 20 and threaded on the free end of the machine screw 23 is a wing nut 24 adapted to be locked in position by means of a lock washer 25. Interposed between the base portion 22 and the boss 21 of the bracket is a series of friction disks 26 for the purpose of frictionally holding the base 22 in an adjusted position after the wing nut 24 has been tightened upon the bolt 23.

The dental flask holder 22 includes a piece of triangular-shaped metal having two of the corners as at 27 and 28 bent upwardly and inwardly in the direction of the dental flask section 29 illustrated in dotted lines. Further, the free ends of the flask engaging clamp are inwardly bent as at 30 and 31 whereby the flask sections will be forced downwardly by a cam action in the direction of the base plate 22.

The other corner of the triangular shaped metal plate 22 is bent upwardly as at 33 to form a support for a screw threaded rod 34 which is threaded in the support 33 to cause the rod 34 and the flask engaging foot 35 on one end thereof to move toward and away from the dental flask 29 when the knurled thumb piece 36 is turned correspondingly.

It is obvious that the dental flask 29 shown in dotted lines may be moved to the desired angular position whereby the same may be worked upon by the dental mechanic during the operation of forming artificial teeth by merely adjusting the base plate 22 in a horizontal manner and then adjusting the brackets 20 relative to the clamp 5 in a vertical manner.

It is to be understood that the form of the invention herewith shown and described is to be taken as a preferred embodiment of the same and that various changes in the shape, size and arrangement of parts may be resorted to without departing from the spirit of the invention or the scope of the sub-joined claim.

I claim:—

A dental flask holder comprising a bench clamp, a disk member at the upper end of the clamp, another disk member adjustably pivoted to the aforesaid disk member on a horizontal axis, a horizontal bracket tangentially projecting from the second disk member, a dental flask holder adjustably pivotally mounted on the bracket on a vertical axis and fixed and cooperating adjustable clamp members carried by the flask holder.

A. R. SNAVELY.